US012793421B2

(12) United States Patent
Niu et al.

(10) Patent No.: US 12,793,421 B2
(45) Date of Patent: Nov. 10, 2026

(54) VEHICLE CONTROL

(71) Applicant: Ford Global Technologies, LLC, Dearborn, MI (US)

(72) Inventors: Yuming Niu, Northville, MI (US); Jacob Slimak, Troy, MI (US); Mark Douglas Malone, Canton, MI (US); Reid James Steiger, Franklin, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 18/773,696

(22) Filed: Jul. 16, 2024

(65) Prior Publication Data

US 2026/0024333 A1 Jan. 22, 2026

(51) Int. Cl.

*G06V 20/40* (2022.01)
*B60W 60/00* (2020.01)
*G06T 5/50* (2006.01)
*G06V 20/58* (2022.01)

(52) U.S. Cl.

CPC ........... *G06V 20/46* (2022.01); *B60W 60/001* (2020.02); *G06T 5/50* (2013.01); *G06V 20/58* (2022.01); *G06T 2207/10016* (2013.01); *G06V 2201/07* (2022.01)

(58) Field of Classification Search

CPC ........ G06V 20/46; G06V 20/58; G06V 10/26; G06V 10/806; G06V 10/80; G06V 2201/07; G06T 5/50; G06T 2207/10016; B60W 60/001
USPC ........... 701/28, 1, 41, 48; 348/148; 382/103, 382/194; 340/937; 345/632
See application file for complete search history.

(56) References Cited

U.S. PATENT DOCUMENTS

| | | | | |
|---|---|---|---|---|
| 9,158,971 | B2 | 10/2015 | Gaidon et al. | |
| 10,019,652 | B2 | 7/2018 | Wang et al. | |
| 10,977,520 | B2 * | 4/2021 | Turkelson | G06F 18/214 |
| 11,417,057 | B2 | 8/2022 | Atsmon | |
| 2014/0247362 | A1 * | 9/2014 | Li | G06T 7/20 |
| 2018/0032040 | A1 * | 2/2018 | Sweet, III | G08G 5/55 |
| 2018/0322348 | A1 * | 11/2018 | Sweet, III | G01S 17/933 |
| 2019/0294881 | A1 * | 9/2019 | Polak | G06N 3/0442 |
| 2020/0011668 | A1 * | 1/2020 | Derhy | G06V 20/56 |
| 2020/0098135 | A1 * | 3/2020 | Ganjineh | G01C 21/3848 |
| 2023/0274536 | A1 * | 8/2023 | Polak | G06V 20/41 |

FOREIGN PATENT DOCUMENTS

| | | | | |
|---|---|---|---|---|
| CN | 104011740 A * | 8/2014 | | G06V 20/20 |

* cited by examiner

*Primary Examiner* — Ellis B. Ramirez
(74) *Attorney, Agent, or Firm* — Frank A. MacKenzie; Brooks Kushman P.C.

(57) ABSTRACT

From a sequence of frames of video data including a start frame followed by intermediate frames followed by an end frame, some of the intermediate frames are identified as a first subset of frames and others of the intermediate frames are identified as a second subset of frames. The second subset of frames includes a target object in an environment. In the frames of the second subset, respective sets of pixels associated with the target object are identified. Based on timestamp offsets of frames in the first subset of frames and frames in the second set of frames, the frames in the first subset are augmented by injecting the respective sets of pixels from the second subset of frames to corresponding frames in the first subset.

20 Claims, 5 Drawing Sheets

VEHICLE CONTROL

BACKGROUND

A vehicle can be equipped with electronic and electromechanical components, e.g., computing devices, networks, sensors and controllers, etc. A vehicle computer can acquire data regarding the vehicle's environment and can operate the vehicle or at least some components thereof based on the data. Vehicle sensors can provide data concerning routes to be traveled and objects to be accounted for in the vehicle's environment.

DETAILED DESCRIPTION

Figure 1:
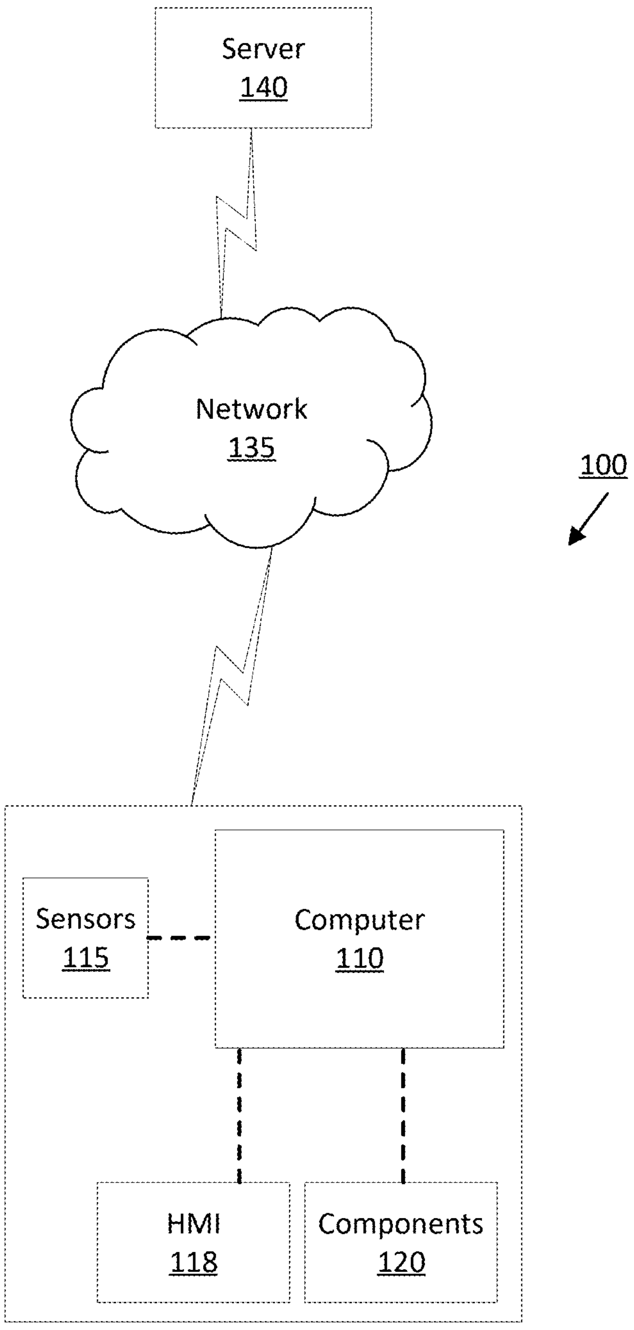
FIG. 1 is a block diagram illustrating an example simulation system to perform motion control operations and motion planning operations.

A vehicle can include a driving system that may control various vehicle components and/or operations without input from a human operator. For example, the driving system may perform perception, motion planning, and motion control operations to operate the vehicle in an environment around the vehicle. Perception operation may obtain information about the vehicle, its surrounding environment, and objects therein based on vehicle sensor data. For example, the perception operation may collect sensor data concerning a speed of the vehicle, a steering wheel torque from a steering system of the vehicle, etc. The motion planning operation is a process by which a path is determined to operate a vehicle within an environment. The motion planning operation can take as input the sensor data obtained by the perception operations. The motion planning operation may plan a path for the vehicle based on the sensor data. The motion control operation is a process by which the vehicle is operated to move according to the planned path. The motion control operation can take the path as its input. The motion control operation can actuate various vehicle components to operate the vehicle along the path. Typically, in current techniques, video data of various scenarios are obtained by, for example, a test vehicle operating in various environments in the real world, and the video data are utilized to identify whether motion control operation and motion planning operation are operating within respective specifications, and to verify the perception operation via replay of the video data. The test vehicle may repeatedly operate along multiple paths through various environments to attempt to obtain video data for each of a vast number of scenarios, which can increase computational resources and an amount of time to obtain and store video data of each respective scenario. Further, the test vehicle may be unable to obtain video data on some scenarios due to the scenario not being present along the path at a time which the test vehicle is operating along the path. As another example, sensors may be installed (e.g., on a stationary structure such as a pole, a beam, etc.) in various real-world environments and arranged to continuously monitor the various environments to capture the various scenarios, which may or may not occur.

As disclosed herein, video data including a target object in an environment can be obtained, thereby enhancing obtained video data and/or the efficiency with which such data are obtained. One subset of frames of the video data can be augmented with respective sets of pixels, from one or more further subsets of frames of the video data, associated with the target object based on timestamp offsets of frames in the one and further subsets. Augmenting the one subset with the respective sets of pixels from the further subset(s) allows for generation of various simulated scenarios from one sequence of frames of video data. Generating various simulated scenarios from one sequence of frames of video data can reduce an amount of time for data collection to obtain video data capturing the various scenarios (e.g., by permitting the generation of various multi-vehicle scenarios from video data capturing a single vehicle scenario) and can reduce an amount of video data to be analyzed, which can reduce an amount of time and computational resources for identifying whether motion control operation and motion planning operation are operating within respective specifications.

A system includes a computer including a processor and a memory, the memory storing instructions executable by the processor to, from a sequence of frames of video data including a start frame followed by intermediate frames followed by an end frame, identify some of the intermediate frames as a first subset of frames and others of the intermediate frames as a second subset of frames. The second subset of frames includes a target object in an environment. The instructions further include instructions to identify, in the frames of the second subset, respective sets of pixels associated with the target object. The instructions further include instructions to, based on timestamp offsets of frames in the first subset of frames and frames in the second subset of frames, augment the frames in the first subset by injecting the respective sets of pixels from the second subset of frames to corresponding frames in the first subset.

The video data can include a second target object in the environment. The instructions can further include instructions to identify, in the frames of the second subset, respective second sets of pixels associated with an absence of the second target object. The instructions can further include instructions to, based on the timestamp offsets, augment the frames in the first subset by injecting the respective second sets of pixels to the corresponding frames in the first subset.

The instructions can further include instructions to perform motion planning operations and motion control operations based on the augmented frames in the first subset.

An initial frame of the second subset can be specified by a user input.

The instructions can further include instructions to adjust a frame rate of the second subset of frames.

The first subset of frames can include the start frame and/or the second subset of frames includes the end frame.

The instructions can further include instructions to identify, in the frames of the second subset, respective second sets of pixels associated with an absence of the target object. The instructions can further include instructions to, based on the timestamp offsets, augment the frames in the first subset by injecting the respective second sets of pixels to the corresponding frames in the first subset.

The instructions can further include instructions to perform motion planning operations and motion control operations based on the augmented frames in the first subset. The instructions can further include instructions to, upon verifying the motion planning operations and the motion control operations for respective scenarios, provide the motion planning operations and the motion control operations to a remote computer. The system can include the remote computer, including a second processor and a second memory storing instructions executable by the second processor such that the remote computer can be programmed to operate a vehicle based on the motion planning operations and the motion control operations.

A method includes, from a sequence of frames of video data including a start frame followed by intermediate frames followed by an end frame, identifying some of the intermediate frames as a first subset of frames and others of the intermediate frames as a second subset of frames. The second subset of frames includes a target object in an environment. The method further includes identifying, in the frames of the second subset, respective sets of pixels associated with the target object. The method further includes, based on timestamp offsets of frames in the first subset of frames and frames in the second subset of frames, augmenting the frames in the first subset by injecting the respective sets of pixels from the second subset of frames to corresponding frames in the first subset.

The video data can include a second target object in the environment. The method can further include identifying, in the frames of the second subset, respective second sets of pixels associated with an absence of the second target object. The method can further include, based on the timestamp offsets, augmenting the frames in the first subset by injecting the respective second sets of pixels to the corresponding frames in the first subset. The method can further include performing motion planning operations and motion control operations based on the augmented frames in the first subset.

An initial frame of the second subset can be specified by a user input.

The method can further include adjusting a frame rate of the second subset of frames.

The first subset of frames can include the start frame and/or the second subset of frames includes the end frame.

The method can further include identifying, in the frames of the second subset, respective second sets of pixels associated with an absence of the target object. The method can further include, based on the timestamp offsets, augmenting the frames in the first subset by injecting the respective second sets of pixels to the corresponding frames in the first subset.

The method can further include performing motion planning operations and motion control operations based on the augmented frames in the first subset.

The method can further include, upon verifying the motion planning operations and the motion control operations for respective scenarios, providing the motion planning operations and the motion control operations to a remote computer.

The method can further include operating, via the remote computer, a vehicle based on the motion planning operations and the motion control operations.

Further disclosed herein is a computing device programmed to execute any of the above method steps. Yet further disclosed herein is a computer program product, including a computer readable medium storing instructions executable by a computer processor, to execute an of the above method steps.

With reference to FIG. 1, an example simulation system 100 includes a computer 110. The simulation system 100 can simulate operating conditions of a vehicle. The computer 110 is programmed to, from a sequence of frames of video data including a start frame followed by intermediate frames followed by an end frame, identify some of the intermediate frames as a first subset of frames and others of the intermediate frames as a second subset of frames. The second subset of frames includes a target object in an environment. The computer 110 is further programmed to identify, in the frames of the second subset, respective sets of pixels associated with the target object. The computer 110 is further programmed to, based on timestamp offsets of frames in the first subset of frames and frames in the second set of frames, augment the frames in the first subset by injecting the respective sets of pixels from the second subset of frames to corresponding frames in the first subset.

The simulation system 100 may include hardware and software such as is known (and/or that could be developed or built in the future). The simulation system 100 may include the computer 110, sensors 115, and vehicle components 120 comprising a vehicle subsystem, e.g., the powertrain subsystem, the steering subsystem, etc. As discussed further below, the simulation system 100 can simulate operation of a virtual vehicle and/or physical vehicle components. The computer 110 is generally arranged for communications on a communication network that can include a controller area network (CAN) or the like, and/or other wired and/or wireless mechanisms. Via the communication network, the computer 110 may receive messages (e.g., CAN messages) from the various devices (e.g., sensors 115) in the simulation system 100. For example, the sensors 115 may provide the computer 110 with data about the components 120 being used for simulation. As mentioned below, various controllers and/or sensors 115 may provide data to the computer 110 via the communication network. Additionally, the computer 110 may transmit messages to a remote server computer 140 (e.g., via a network 135 as discussed below).

The computer 110 can collect and process data about the vehicle components 120 being used for simulation. Based on the data, the computer 110 can actuate the vehicle components 120 during the simulation. For example, the vehicle subsystem being simulated can be the powertrain subsystem, a steering subsystem, etc. In these circumstances, the computer 110 can be a powertrain controller, a steering controller, etc. The computer 110 can control operation of the vehicle components 120 of the vehicle subsystem being simulated. For example, the operation can be controlling steering, controlling a human-machine interface, etc. The computer 110 may be an electronic control unit (ECU). An "electronic control unit" (ECU) is a device including a processor and a memory that includes programming (i.e., the memory stores instructions executable by the processor) to control one or more vehicle components 120.

Sensors 115 can include a variety of devices. For example, various controllers in a simulation system 100 may operate as sensors 115 to provide data (e.g., data relating to subsystem and/or component status) via wired communication to the computer 110. Further, other sensors 115 could include cameras, motion detectors, etc. (i.e., sensors 115 to provide data for evaluating a position of a component, a condition of a component, etc.). The sensors 115 could, without limitation, also include radar, LIDAR, and/or ultrasonic transducers.

The simulation system 100 can simulate one or more actual (i.e., physical) vehicle components 120. For example, the simulation system 100 can include each vehicle component 120 of a vehicle powertrain subsystem and a steering subsystem. As another example, the simulation system 100 can include vehicle components 120 constituting a portion of one or more vehicle subsystems. In this context, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), or the like.

As another example, the simulation system 100 can simulate a virtual vehicle. In such an example, the computer 110 can input a virtual vehicle into a vehicle dynamics model. The "vehicle dynamics model" is a physics-based kinematic or dynamic model describing vehicle motion that outputs respective vehicle states according to various control parameters (e.g., steering wheel torque, etc.). The vehicle dynamics model can model and output performance of the virtual vehicle (or one or more components thereof) actuated to move along the various trajectories. By inputting the virtual vehicle to the vehicle dynamics model, the computer 110 can obtain data specifying respective vehicle states while operating the virtual vehicle along various trajectories. That is, the computer 110 can simulate motion control operations of the virtual vehicle along various trajectories. In this situation, the computer 110 can determine whether output of the vehicle driving system operates the virtual vehicle along a path output by the motion planning operations.

The simulation system 100 further includes a human-machine interface (HMI) 118. The HMI 118 includes user input devices such as knobs, buttons, switches, pedals, levers, touchscreens, and/or microphones, etc. The input devices may include sensors 115 to detect a user input and provide user input data to the computer 110. That is, the computer 110 may be programmed to receive user input from the HMI 118. A user may provide the user input via the HMI 118 (e.g., by selecting a virtual button on a touchscreen display, by providing voice commands, etc.). For example, a touchscreen display included in an HMI 118 may include sensors 115 to detect that a user selected a virtual button on the touchscreen display to, for example, select or deselect an operation, which input can be received in the computer 110 and used to determine the selection of the user input.

The HMI 118 typically further includes output devices such as displays (including touchscreen displays), speakers, and/or lights, etc., that output signals or data to the occupant. The HMI 118 may be coupled via wired communication to the computer 110 and can send and/or receive messages to/from the computer 110 and other vehicle sub-systems.

The network 135 represents one or more mechanisms by which the computer 110 may communicate with remote computing devices (e.g., the remote server computer 140, a mobile device, etc.). Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote server computer 140 can be a conventional computing device (i.e., including one or more processors and one or more memories) programmed to provide operations such as disclosed herein. Further, the remote server computer 140 can be accessed via the network 135 (e.g., the Internet, a cellular network, and/or some other wide area network).

The computer 110 is programmed to simulate operation of a vehicle in various scenarios. A scenario is video data including target objects (i.e., objects other than the vehicle) in an environment around the vehicle and relative movement between the target objects and the vehicle in the environment. Video data can be in digital format and encoded according to conventional compression and/or encoding techniques, providing a sequence of frames of image data where each frame can have a different timestamp and/or represent a specified period of time, e.g., 10 frames per second, and arranged in a sequence. The video data includes a sequence of frames having a start frame followed by intermediate frames followed by an end frame. Video data can, for example, be obtained via sensors on a test vehicle operating in the environment. As another example, video data can be obtained via a stationary sensor arranged to have a field of view including the environment. The various scenarios can be maintained in a database, or the like. The computer 110 can access the database (e.g., stored in a memory of the computer 110) to iteratively or sequentially execute the scenarios until each scenario has been simulated. Some of the scenarios are captured by sensor data. Others of the scenarios are simulated scenarios (i.e., generated by the computer 110).

To generate a simulated scenario, the computer 110 selects a scenario (i.e., video data including a target object in an environment). The computer 110 can select the scenario (i.e., video data) based on a first user input specifying the scenario. The computer 110 can detect the first user input via the HMI 118. That is, in response to receiving the first user input, the computer 110 can access the database to select the specified scenario (i.e., video data).

The computer 110 is programmed to determine, from the sequence of frames of the selected video data, a first subset of the frames and a second subset of the frames. For example, the computer 110 can detect (e.g., via the HMI 118) a second user input specifying an initial frame and a terminal frame of the second subset. The terminal frame of the second subset may be the end frame of the sequence of frames. The initial frame of the second subset is one intermediate frame of the sequence of frames. That is, the second subset includes the specified initial frame, the specified terminal frame, and the intermediate frames arranged in the sequence between the specified initial frame and the specified terminal frame.

The second user input may, for example, further specify an initial frame and a terminal frame of the first subset. As another example, the computer 110 may detect another user input specifying the initial frame and/or the terminal frame of the first subset. The initial frame of the second subset may be the start frame of the sequence of frames. The terminal frame of the second subset is one intermediate frame of the sequence of frames. That is, the first subset includes the specified initial frame, the specified terminal frame, and the intermediate frames arranged in the sequence between the specified initial frame and the specified terminal frame.

The first subset of frames is distinct from the second subset of frames. That is, a frame is not included in both the first subset of frames and the second subset of frames. Said differently, any one frame in the sequence of frames can be included in the first subset, the second subset, or neither subset, but cannot be included in both the first and second subsets.

The computer 110 is programmed to identify respective sets of pixels in the frames of the second subset associated with a target object. As an example, the second user input may further specify a target object in the initial frame of the second subset. In this situation, the computer 110 can analyze the frames in the second subset (e.g., using pattern recognition and/or image analysis techniques) to identify, for each of the frames in the second subset, the respective sets of pixels associated with the target object. Alternatively, the second user input may, for example, specify the respective sets of pixels via a two-dimensional (2D) bounding box. In this situation, the computer 110 can analyze the frames in the second subset to identify, for each of the frames in the second subset, the respective sets of pixels contained within the 2D bounding box.

A 2D bounding box is a closed boundary defining the respective set of pixels. For example, the pixels within a bounding box can represent a same object (e.g., a bounding box can define pixels representing an image of an object). Said differently, the bounding box may be defined as a smallest rectangular box that includes all of the pixels of the corresponding object. As another example, pixels within a bounding box can represent a lack of an object (e.g., the bounding box can define pixels representing an absence of an object).

The computer 110 may be programmed to identify respective second sets of pixels in the frames of the second subset. The respective second sets of pixels may, for example, be associated with an absence of the target object. That is, the respective second sets of pixels may represent an image of the environment that lacks the target object. As another example, the respective second sets of pixels may be associated with a second target object. The second user input may, for example, further specify the respective second sets of pixels in the same manner as just discussed above. As another example, the computer 110 may detect another user input specifying the respective second sets of pixels in the frames of the second subset.

The computer 110 may be programmed to adjust a frame rate (i.e., a number of frames per a period of time) of the second subset. For example, the computer 110 may detect (e.g., via the HMI 118) a third user input specifying an adjusted frame rate of the second subset of frames. The computer 110 can, for example, insert frames to the second subset of frames (e.g., according to frame interpolation techniques) to achieve the adjusted frame rate when the adjusted frame rate is greater than a frame rate of the video data. As another example, the computer 110 can remove frames from the second subset of frames (e.g., according to data processing techniques) to achieve the adjusted frame rate when the adjusted frame rate is less than the frame rate of the video data. In this situation, the computer 110 can then adjust the sequencing of the second subset of the frames to account for the removed frames. That is, the computer 110 can shift respective frames in the second subset a number of frames towards the initial frame corresponding to a number of removed frames between the respective frames and the initial frame.

The computer 110 determines timestamp offsets between the corresponding frames of the second subset and the first subset. To determine the timestamp offset between the corresponding frames, the computer 110 determines a difference between a timestamp of the initial frame in the first subset and a timestamp of the initial frame in the second subset. The computer 110 iterates through the first subset to determine the respective timestamp offset between each frame in the first subset and the corresponding frame in the second subset.

The computer 110 augments the frames in the first subset based on the respective sets of pixels in the frames of the second subset. Specifically, the computer 110 injects the respective sets of pixels included in respective frames of the second subset to the corresponding frame in the first subset. The computer 110 determines the corresponding frame based on the timestamp offset between respective frames in the respective sequences of the first and second subsets. Augmenting the frames in the first subset generates simulated scenarios from the video data. The computer 110 can then update the database to include the simulated scenarios.

The frames in the first subset can be augmented in various manners based on various respective sets of pixels in the frames of the second subset. As one example, the frames in the first subset can be augmented to include multiple target objects (e.g., when the respective sets of pixels are associated with the target object). As another example, the frames in the first subset can be augmented to include one or more second target objects (e.g., when the respective second sets of pixels are associated with the second target object). As another example, the frames in the first subset can be augmented to remove the second target object (e.g., when the respective second sets of pixels are associated with an absence of the second target object). As another example, the frames in the first subset can be augmented to update a position of the target object (e.g., when the respective sets of pixels are associated with the target object and the respective second sets of pixels are associated with the absence of the target object). In this situation, the respective second sets of pixels associated with the absence of the target object can be injected to the frames in the first subset to remove the target object at an initial position in the frames of the first subset. The respective sets of pixels associated with the target object can then be injected to the frames in the first subset to insert the target object at an updated position in the frames of the first subset. As another example, the frames in the first subset can be augmented to represent an adjusted speed of the (second) target object (e.g., when the frame rate of the second subset is adjusted).

Further, the computer 110 may be programmed to determine, from the sequence of frames of the selected video data, one or more further subsets of the frames in a same manner as discussed above regarding determining the first and second subsets. The computer 110 may be programmed to then identify respective sets of pixels in the frames of the further subset(s) in a same manner as discussed above regarding determining the respective sets of pixels in the frames of the second subset. The computer 110 may be programmed to adjust a frame rate (i.e., a number of frames per a period of time) of the further subset(s), as discussed above. The computer 110 may be programmed to augment the frames in the first subset based on respective sets of pixels in frames of further subset(s), as discussed above. That is, the first subset can be augmented in various manners based on various subsets of frames to generate various simulated scenarios.

The computer 110 may be programmed to perform motion planning and control operations of the vehicle driving system for the scenarios and simulated scenarios in the database. Motion planning operations are programming of the vehicle driving system that generates a path for a vehicle in response to the scenario. The motion planning operations may be stored (e.g., in a memory of the computer 110). The motion planning operations can be, e.g., a navigational algorithm that generates location coordinates for the vehicle over time. As an example, the motion planning operations can determine the path with a path polynomial. The path polynomial y(x) is a model that predicts the path as a line traced by a polynomial equation. The path polynomial y(x) predicts the path for a predetermined upcoming distance x, by determining a lateral coordinate y, e.g., measured in meters:

$$y(x) = a_0 + a_1x + a_2x^2 + a_3x^3 + \ldots + a_nx^n \quad (1)$$

The coefficients $\alpha_n$ can represent one or more characteristics of the path, e.g., for a Nth degree path polynomial, $\alpha_0$ an offset, i.e., a lateral distance between the path and a reference point of the vehicle at the upcoming distance x, $\alpha_1$ through $\alpha_n$ represent polynomial coefficients describing the path.

Motion control operations are programming of the vehicle driving system for following the path to achieve the maneuver. The motion control operations can be stored (e.g., in a memory of the computer 110). The motion control operations determine control parameters of the vehicle that, if met, would move the vehicle along the trajectory. For example, the motion control operations can determine a longitudinal torque, a steering torque, a steering wheel angle, etc.

The motion control operations can determine the control parameters of the vehicle with motion control algorithm. A "motion control algorithm" is a control algorithm that outputs one or more control parameters based on inputs of one or more vehicle states. For example, the path can be input to the motion control algorithm. The motion control algorithm can then output control parameters for the vehicle to operate along the path. The motion control algorithm can be, e.g., a model predictive control algorithm, a linear-quadratic regulator algorithm, a full state feedback control algorithm, a partial state feedback control algorithm, or a pole placement algorithm.

The computer 110 can, for example, simulate operation of a virtual vehicle (e.g., via the vehicle dynamics model, as discussed above) in the various scenarios (or simulated scenarios). For example, the computer 110 can operate the virtual vehicle along a path (e.g., output by the motion planning operations) based on the control parameters (e.g., output by the motion control operations) for a (simulated) scenario. The computer 110 can compare operation of the virtual vehicle to one or more path constraints. A "path constraint" is a limit on vehicle operation along a path based on the scenario in which the vehicle is operating (e.g., a minimum distance between the path and a target object adjacent to a portion of the path, a specification limiting speed along a portion of the path, a lane change operation being permitted or prohibited based on a presence or absence of a target object, etc.). If the virtual vehicle exceeds (or violates) at least one path constraint, then the computer 110 determines that the motion planning and control operations for the (simulated) scenario are unverified. If the virtual vehicle does not exceed (or violate) any path constraints, then the computer 110 determines that the motion planning and control operations for the (simulated) scenario are verified.

The computer 110 can verify the motion planning and control operations of the vehicle driving system for each (simulated) scenario in this manner. If the motion planning and control operations for each (simulated) scenario are verified, then the computer 110 can determine that the motion planning and control operations of the vehicle driving system are verified. In this situation, the computer 110 may provide the motion planning and control operations to the remote server computer 140/or a vehicle computer 210 (e.g., via the network 135). If the motion planning and control operations for at least one (simulated) scenario is unverified, then the computer 110 determines that the motion planning and control operations of the vehicle driving system are unverified. In this situation, the computer 110 may provide a message (e.g., via the network 135) to the remote server computer 140/or a vehicle computer 210 indicating that the motion planning and control operations of the vehicle driving system are unverified.

The remote server computer 140 may be programmed to receive (e.g., from the computer 110) the verified motion planning and control operations. Upon receiving the verified motion planning and control operations, the remote server computer 140 may store the verified motion planning and control operations (e.g., in a memory of the remote server computer 140). The remote server computer 140 may be programmed to provide the verified motion planning and control operations to a vehicle computer 210 in a vehicle 205 (e.g., via the network 135).

Figure 2:
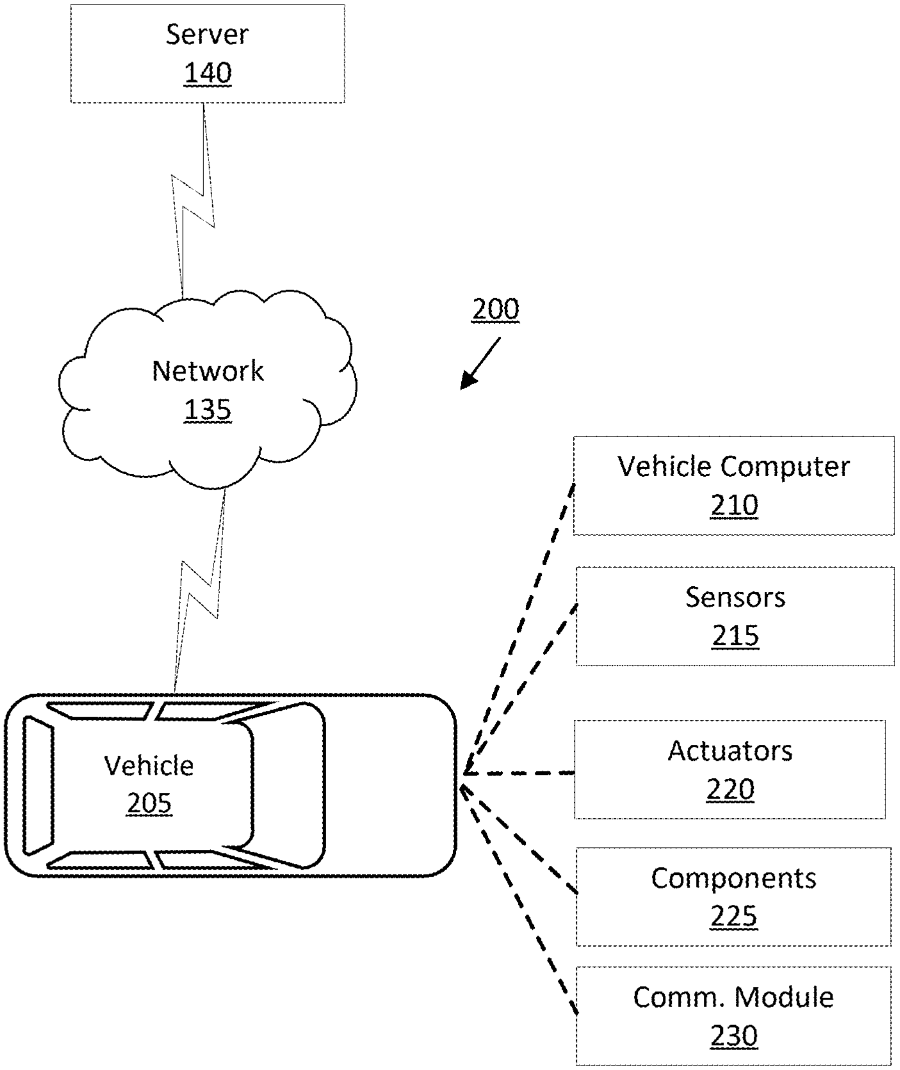
FIG. 2 is a block diagram illustrating an example vehicle control system.

Turning now to FIG. 2, an example vehicle control system 200 includes a vehicle 205. The vehicle 205 includes a vehicle computer 210, sensors 215, actuators 220 to actuate various vehicle components 225, and a vehicle communications module 230. The communications module 230 allows the vehicle computer 210 to communicate with the remote server computer 140, and/or other vehicles (e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via the packet network 135).

The vehicle computer 210 includes a processor and a memory such as are known. The memory includes one or more forms of computer-readable media, and stores instructions executable by the vehicle computer 210 for performing various operations, including as disclosed herein. The vehicle computer 210 can further include two or more computing devices operating in concert to carry out vehicle 205 operations including as described herein. Further, the vehicle computer 210 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation (e.g., an ASIC for processing sensor data and/or communicating the sensor data). In another example, the vehicle computer 210 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided premanufacturing, whereas logical components inside an FPGA may be configured based on VHDL programming (e.g. stored in a memory electrically connected to the FPGA circuit). In some examples, a combination of processor(s), ASIC(s), and/or FPGA circuits may be included in the vehicle computer 210.

The vehicle computer 210 may include programming to operate one or more of vehicle 205 propulsion, steering, transmission, climate control, interior and/or exterior lights, horn, doors, etc., as well as to determine whether and when the vehicle computer 210, as opposed to a human operator, is to control such operations.

The vehicle computer 210 may include or be communicatively coupled to (e.g., via a vehicle communications network such as a communications bus as described further below) more than one processor (e.g., included in electronic controller units (ECUs) or the like included in the vehicle 205) for monitoring and/or controlling various vehicle components 225 (e.g., a transmission controller, a steering controller, etc.). The vehicle computer 210 is generally arranged for communications on a vehicle communication network that can include a bus in the vehicle 205 such as a controller area network (CAN) or the like, and/or other wired and/or wireless mechanisms.

Via the vehicle 205 network, the vehicle computer 210 may transmit messages to various devices in the vehicle 205 and/or receive messages (e.g., CAN messages) from the various devices (e.g., sensors 215, an actuator 220, ECUs, etc.). Alternatively, or additionally, in cases where the vehicle computer 210 actually comprises a plurality of devices, the vehicle communication network may be used for communications between devices represented as the vehicle computer 210 in this disclosure. Further, as mentioned below, various controllers and/or sensors 215 may provide data to the vehicle computer 210 via the vehicle communication network.

The vehicle computer 210 in the vehicle 205 can receive data from the sensors 215. Vehicle 205 sensors 215 may include a variety of devices such as are known to provide data to the vehicle computer 210. For example, the sensors 215 may include Light Detection And Ranging (LIDAR) sensor(s) 215, etc., disposed on a top of the vehicle 205, behind a vehicle 205 front windshield, around the vehicle 205, etc., that provide relative locations, sizes, and shapes of objects surrounding the vehicle 205. As another example, one or more radar sensors 215 fixed to vehicle 205 bumpers may provide data to provide locations of the objects, second vehicles, etc., relative to the location of the vehicle 205. The sensors 215 may further alternatively or additionally, for example, include camera sensor(s) 215 (e.g. front view, side view, etc.) providing images from an area surrounding the vehicle 205. In the context of this disclosure, an object is a physical (i.e., material) item that has mass and that can be represented by physical phenomena (e.g., light or other electromagnetic waves, or sound, etc.) detectable by sensors 215. Thus, the vehicle 205, as well as other items including as discussed below, fall within the definition of "object" herein.

The vehicle computer 210 is programmed to receive data from one or more sensors 215 substantially continuously, periodically, and/or when instructed by a remote server computer 140, etc. The data may, for example, include a location of the vehicle 205. Location data specifies a point or points on a ground surface and may be in a known form (e.g., geo-coordinates such as latitude and longitude coordinates obtained via a navigation system, as is known, that uses the Global Positioning System (GPS)). Additionally, or alternatively, the data can include a location of an object (e.g., a vehicle, a sign, a tree, etc.) relative to the vehicle 205. As one example, the data may be image data of the environment around the vehicle 205. In such an example, the image data may include one or more objects and/or markings (e.g., lane markings) on or along a road. Image data herein means digital image data (e.g., comprising pixels with intensity and color values) that can be acquired by camera sensors 215. The sensors 215 can be mounted to any suitable location in or on the vehicle 205 (e.g., on a vehicle 205 bumper, on a top of a vehicle 205, etc.) to collect images of the environment around the vehicle 205.

The vehicle 205 actuators 220 are implemented via circuits, chips, or other electronic and or mechanical components that can actuate various vehicle subsystems in accordance with appropriate control signals as is known. The actuators 220 may be used to control components 225, including propulsion and steering of a vehicle 205.

In the context of the present disclosure, a vehicle component 225 is one or more hardware components adapted to perform a mechanical or electro-mechanical function or operation—such as moving the vehicle 205, slowing or stopping the vehicle 205, steering the vehicle 205, etc. Non-limiting examples of components 225 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a park assist component, an adaptive cruise control component, an adaptive steering component, etc.

In addition, the vehicle computer 210 may be configured for communicating via a vehicle-to-vehicle communication module 230 or interface with devices outside of the vehicle 205 (e.g., through a vehicle-to-vehicle (V2V) or vehicle-to-infrastructure (V2X) wireless communications (cellular and/or short-range radio communications, etc.) to another vehicle, and/or to a remote server computer 140 (typically via direct radio frequency communications)). The communications module 230 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 230 include cellular, Bluetooth, IEEE 802.11, dedicated short range communications (DSRC), cellular V2X (CV2X), and/or wide area networks (WAN), including the Internet, providing data communication services. The label "V2X" is used herein for communications that may be vehicle-to-vehicle (V2V) and/or vehicle-to-infrastructure (V2I), and that may be provided by communication module 230 according to any suitable short-range communications mechanism (e.g., DSRC, cellular, or the like).

The vehicle computer 210 may be programmed to receive the verified motion planning and control operations from the remote server computer 140 and/or the computer 110 (e.g., via the network 135). The vehicle computer 210 may then store the verified motion planning and control operations (e.g., in a memory of the vehicle computer 210). The vehicle computer 210 may operate the vehicle 205 based on the verified motion planning and control operations. For example, the vehicle computer 210 can provide sensor 215 data describing respective vehicle states and an environment around the vehicle 205 as input to the motion planning operation that outputs a path for the vehicle 205. The vehicle computer 210 can then provide the path to the motion control operations that outputs control parameters to operate the vehicle 205 according to the path. The vehicle computer 210 can actuate one or more vehicle components 225 according to the output control parameters.

Figure 3:
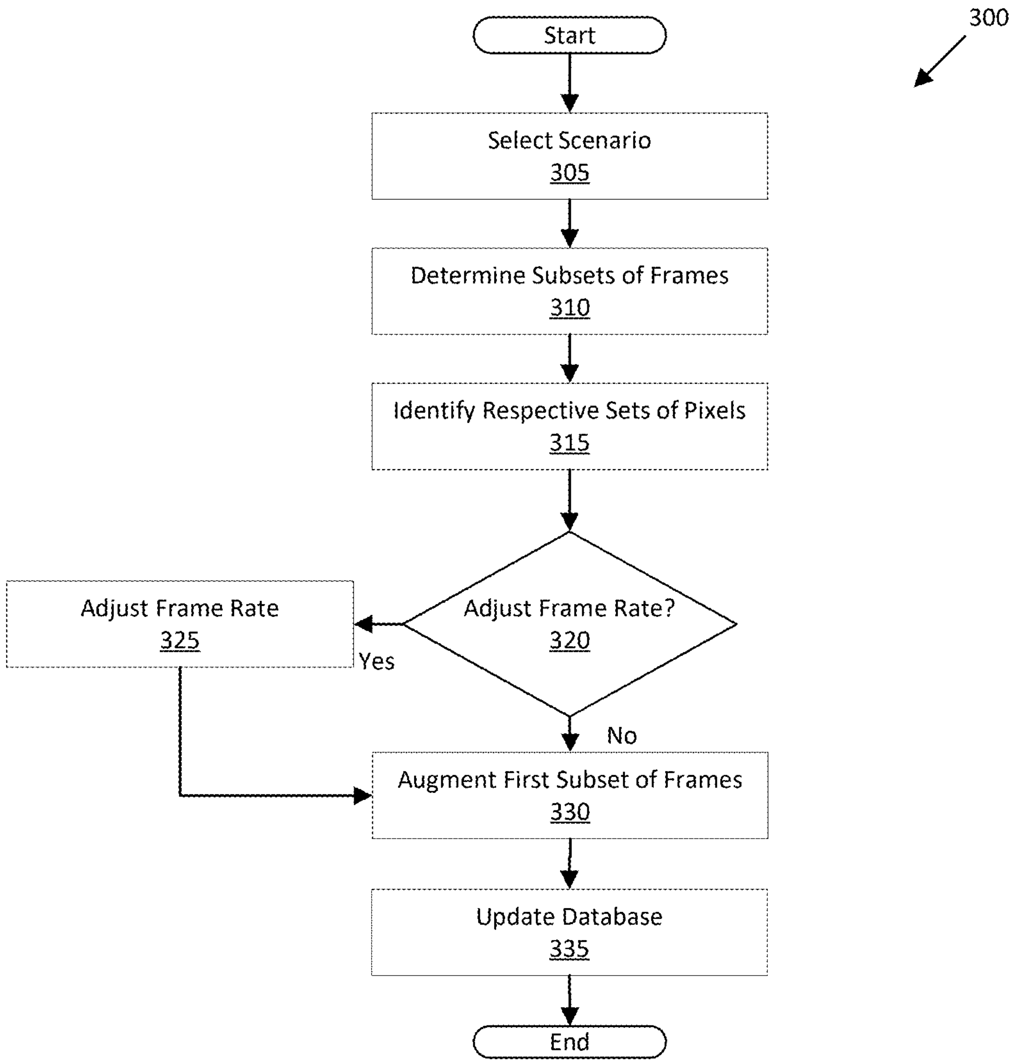
FIG. 3 an example flowchart of an example process for generating a simulated scenario via the example simulation system.

FIG. 3 is a diagram of an example process 300 for generating a simulated scenario. The process 300 begins in a block 305. The process 300 can be carried out by a computer 110 included in a simulation system 100 executing program instructions stored in a memory thereof.

In the block 305, the computer 110 selects a scenario (i.e., video data). For example, the computer 110 can access a database (e.g., stored in a memory of the computer 110) to select the scenario, as discussed above. The computer 110 can identify the scenario based on detecting (e.g., via an HMI 118) a first user input specifying the scenario, as discussed above. The process 300 continues in a block 310.

In the block 310, the computer 110 determines, from a sequence of frames of the video data, a first subset of frames and a second subset of frames. The computer 110 can identify the respective frames to be included in the first subset and the second subset based on detecting (e.g., via the HMI 118) a second user input, as discussed above. The process 300 continues in a block 315.

In the block 315, the computer 110 identifies respective sets of pixels associated with a target object in the frames of the second subset of frames. The computer 110 can identify the respective sets of pixels based on the second user input, as discussed above. The computer 110 can further identify respective second sets of pixels (e.g., associated with a presence of a second target object or an absence of the (second) target object) based on the second user input, as discussed above. The process 300 continues in a block 320.

In the block 320, the computer 110 determines whether to adjust the frame rate of the second subset of frames. The computer 110 can, for example, detect (e.g., via the HMI 118) a third user input specifying the adjusted frame rate of the second subset of frames, as discussed above. If the computer 110 detects the third user input, then the process 300 continues in a block 325. Otherwise, the process 300 continues in a block 330.

In the block 325, the computer 110 adjusts the frame rate of the second subset of frames. For example, the computer 110 can remove or inject frames into the second subset of frames to achieve the specified adjusted frame rate, as discussed above. The process 300 continues in the block 330.

In the block 330, the computer 110 augments the first subset of frames. Specifically, the computer 110 injects the respective sets of pixels included in respective frames of the second subset to the corresponding frame in the first subset based on timestamp offsets of frames in the first subset of frames and frames in the second set of frames, as discussed above. The process 300 continues in a block 335.

In the block 335, the computer 110 updates the database to include the simulated scenario. The process 300 may end following the block 335. Alternatively, the process 300 may return to the block 305 (e.g., in response to receiving another first user input specifying the scenario or another scenario from which to generate another simulated scenario).

Figure 4:
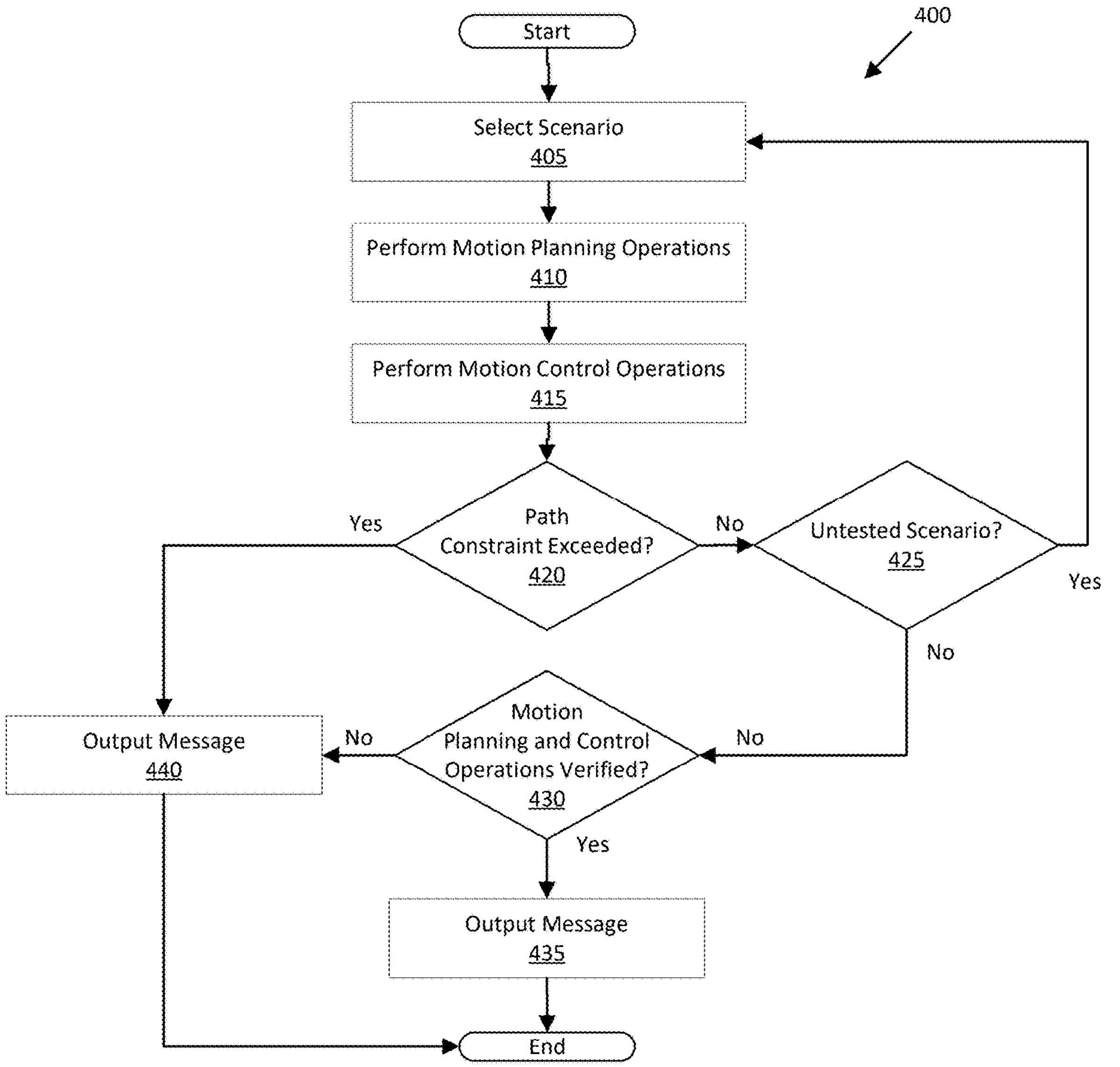
FIG. 4 is an example flowchart of an example process for performing motion planning and control operations via the example simulation system.

FIG. 4 is a diagram of an example process 400 for performing motion planning and control operations of a vehicle driving system. The process 400 begins in a block 405. The process 400 can be carried out by the computer 110 included in the simulation system 100 executing program instructions stored in a memory thereof.

In the block 405, the computer 110 selects a (simulated) scenario. To select the (simulated) scenario, the computer 110 can access a database that stores a plurality of (simulated) scenarios. The computer 110 can identify the (simulated) scenario to be selected based on detecting (e.g., via the HMI 118) a user input. The process 400 continues in a block 410.

In the block 410, the computer 110 performs motion planning operations for the scenario, as discussed above. The motion planning operations outputs a planned path for the scenario. The process 400 continues in a block 415.

In the block 415, the computer 110 performs motion control operations for the scenario. That is, the computer 110 inputs the planned path to the motion control operations that output control parameters, as discussed above. The process 400 continues in a block 420.

In the block 420, the computer 110 determines whether a path constraint is exceeded. For example, the computer 110 can actuate a virtual vehicle (e.g., in a vehicle dynamics model) based on the control parameters output by the motion control operations. The computer 110 can then compare the movement of the virtual vehicle to the target objects included in the scenario, as discussed above. If the virtual vehicle exceeds (or violates) at least one path constraint, then the computer 110 determines that the motion planning and control operations for the scenario are unverified. If the virtual vehicle does not exceed (or violate) any path constraint, then the computer 110 determines that the motion planning and control operations for the scenario are verified. If the motion planning and control operations for the scenario are unverified, the process 400 continues in a block 440. Otherwise, the process 400 continues in a block 425.

In the block 425, the computer 110 determines whether at least one (simulated) scenario warrants simulation. For example, the computer 110 can access the database to determine whether each (simulated) scenario has been simulated. If the computer 110 determines that at least (simulated) scenario is indicated as warranting simulation in the database, then the process 400 returns to the block 405. If the computer 110 determines that all (simulated) scenarios are indicated as being simulated in the database, then the process 400 continues in the block 430.

In the block 430, the computer 110 determines whether motion planning and control operations for the vehicle driving system are verified. If the motion planning and control operations for each of the (simulated) scenarios is verified, then the computer 110 determines that the motion planning operations of the vehicle driving system are verified. If the motion planning and control operations for at least one of the (simulated) scenarios is unverified, then the computer 110 determines that the motion planning and control operations of the vehicle driving system are unverified. If the motion planning and control operations for the vehicle driving system are verified, then the process 400 continues in a block 435. Otherwise, the process 400 continues in a block 440.

In the block 435, the computer 110 may provide a message (e.g., via the network 135) to the remote server computer 140 and/or a vehicle computer 210 indicating that the motion planning and control operations of the vehicle driving system are verified, as discussed above. Additionally, or alternatively, the computer 110 may provide the motion planning and control operations to the remote server computer 140 and/or the vehicle computer 210 (e.g., via the network 135), as discussed above. The process 400 ends following the block 435.

In the block 440, the computer 110 may provide a message (e.g., via the network 135) to the remote server computer 140 and/or the vehicle computer 210 indicating that the motion planning and control operations of the vehicle driving system are unverified. The process 400 ends following the block 440.

Figure 5:
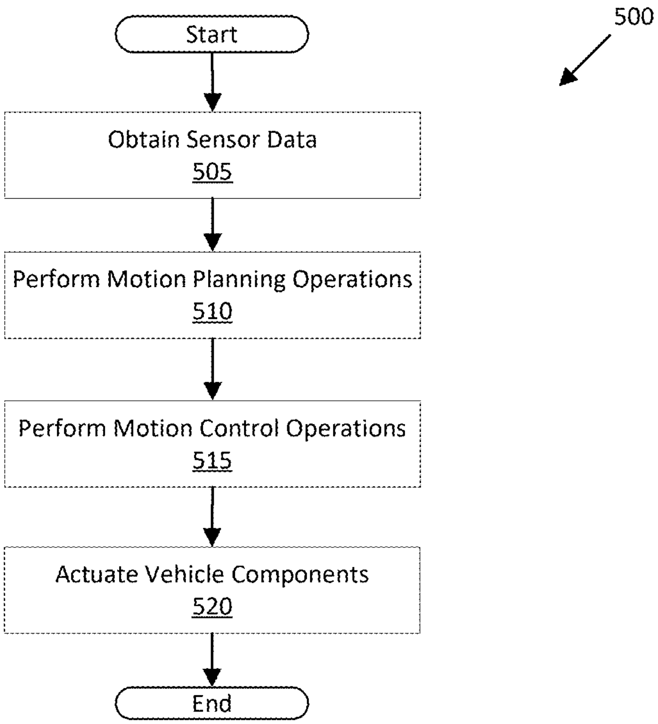
FIG. 5 is an example flowchart of an example process for performing motion planning and control operations on a vehicle.

FIG. 5 is a diagram of an example process 500 for performing motion planning and control operations in a vehicle 205. The process 500 begins in a block 505. The process 500 can be carried out by a vehicle computer 210 included in the vehicle 205 executing program instructions stored in a memory thereof.

In a block 505, the vehicle computer 210 obtains sensor 215 data describing respective vehicle states and an environment around the vehicle 205. The process 500 continues in a block 510.

In the block 510, the vehicle computer 210 performs motion planning operations based on the sensor 215 data obtained in the block 510. The motion planning operations output a planned path for the vehicle 205. The process 500 continues in a block 515.

In the block 515, the vehicle computer 210 performs motion control operations based on the planned path, as discussed above. The motion control operations output control parameters for the vehicle 205. The process 500 continues in a block 520.

In the block 520, the vehicle computer 210 operates the vehicle 205 based on the motion control operations and the motion planning operations. For example, the vehicle computer 210 can actuate vehicle components 125 to operate the vehicle 205 along the planned path based on the control parameters. The process 500 may end following the block 520. Alternatively, the process 500 may return to the block 505 (e.g., while the vehicle 205 remains in an ON state).

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions (e.g., from a memory, a computer readable medium, etc.) and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:

from a sequence of frames of video data including a start frame followed by intermediate frames followed by an end frame, identify some of the intermediate frames as a first subset of frames and others of the intermediate frames as a second subset of frames, the second subset of frames including a target object in an environment;

identify, in the frames of the second subset, respective sets of pixels associated with the target object; and based on timestamp offsets of frames in the first subset of frames and frames in the second subset of frames, augment the frames in the first subset by injecting the respective sets of pixels from the second subset of frames to corresponding frames in the first subset, so as to insert the target object into the corresponding frames of the first subset.

2. The system of claim 1, wherein the video data includes a second target object in the environment, wherein the instructions further include instructions to:

identify, in the frames of the second subset, respective second sets of pixels associated with an absence of the second target object; and based on the timestamp offsets, augment the frames in the first subset by injecting the respective second sets of pixels to the corresponding frames in the first subset.

3. The system of claim 2, wherein the instructions further include instructions to perform motion planning operations and motion control operations based on the augmented frames in the first subset.

4. The system of claim 1, wherein an initial frame of the second subset is specified by a user input.

5. The system of claim 1, wherein the instructions further include instructions to adjust a frame rate of the second subset of frames.

6. The system of claim 1, wherein the first subset of frames includes the start frame and/or the second subset of frames includes the end frame.

7. The system of claim 1, wherein the instructions further include instructions to:

identify, in the frames of the second subset, respective second sets of pixels associated with an absence of the target object; and based on the timestamp offsets, augment the frames in the first subset by injecting the respective second sets of pixels to the corresponding frames in the first subset.

8. The system of claim 1, wherein the instructions further include instructions to perform motion planning operations and motion control operations based on the augmented frames in the first subset.

9. The system of claim 8, wherein the instructions further include instructions to, upon verifying the motion planning operations and the motion control operations for respective scenarios, provide the motion planning operations and the motion control operations to a remote computer.

10. The system of claim 9, further comprising the remote computer, including a second processor and a second memory storing instructions executable by the second processor such that the remote computer is programmed to operate a vehicle based on the motion planning operations and the motion control operations.

11. A method, comprising:

from a sequence of frames of video data including a start frame followed by intermediate frames followed by an end frame, identifying some of the intermediate frames as a first subset of frames and others of the intermediate frames as a second subset of frames, the second subset of frames including a target object in an environment;

identifying, in the frames of the second subset, respective sets of pixels associated with the target object; and based on timestamp offsets of frames in the first subset of frames and frames in the second subset of frames, augmenting the frames in the first subset by injecting the respective sets of pixels from the second subset of frames to corresponding frames in the first subset, so as to insert the target object into the corresponding frames of the first subset.

12. The method of claim 11, wherein the video data includes a second target object in the environment, the method further comprising:

identifying, in the frames of the second subset, respective second sets of pixels associated with an absence of the second target object; and based on the timestamp offsets, augmenting the frames in the first subset by injecting the respective second sets of pixels to the corresponding frames in the first subset.

13. The method of claim 12, further comprising performing motion planning operations and motion control operations based on the augmented frames in the first subset.

14. The method of claim 11, wherein an initial frame of the second subset is specified by a user input.

15. The method of claim 11, further comprising adjusting a frame rate of the second subset of frames.

16. The method of claim 11, wherein the first subset of frames includes the start frame and/or the second subset of frames includes the end frame.

17. The method of claim 11, further comprising:

identifying, in the frames of the second subset, respective second sets of pixels associated with an absence of the target object; and based on the timestamp offsets, augmenting the frames in the first subset by injecting the respective second sets of pixels to the corresponding frames in the first subset.

18. The method of claim 11, further comprising performing motion planning operations and motion control operations based on the augmented frames in the first subset.

19. The method of claim 18, further comprising, upon verifying the motion planning operations and the motion control operations for respective scenarios, providing the motion planning operations and the motion control operations to a remote computer.

20. The method of claim 19, further comprising operating, via the remote computer, a vehicle based on the motion planning operations and the motion control operations.

* * * * *